United States Patent
Ju et al.

(10) Patent No.: US 9,760,868 B2
(45) Date of Patent: Sep. 12, 2017

(54) ELECTRONIC DOCUMENT ANNOTATION

(75) Inventors: Lin Ju, Beijing (CN); Patrick J. O'Sullivan, Dublin (IE); Fred Raguillat, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1253 days.

(21) Appl. No.: 13/516,499

(22) PCT Filed: Aug. 5, 2010

(86) PCT No.: PCT/EP2010/061442
§ 371 (c)(1),
(2), (4) Date: Jul. 19, 2012

(87) PCT Pub. No.: WO2011/072890
PCT Pub. Date: Jun. 23, 2011

(65) Prior Publication Data
US 2012/0278695 A1    Nov. 1, 2012

(30) Foreign Application Priority Data
Dec. 15, 2009    (EP) .................................... 09179211

(51) Int. Cl.
*G06Q 10/10*    (2012.01)
*H04L 12/58*    (2006.01)

(52) U.S. Cl.
CPC ........... *G06Q 10/107* (2013.01); *H04L 12/58* (2013.01)

(58) Field of Classification Search
USPC ........................................................ 715/230
See application file for complete search history.

(56) References Cited

U.S. PATENT DOCUMENTS

| | | | | |
|---|---|---|---|---|
| 5,581,682 A * | 12/1996 | Anderson et al. | ............ | 715/236 |
| 6,687,878 B1 * | 2/2004 | Eintracht et al. | ............. | 715/201 |
| 7,111,009 B1 * | 9/2006 | Gupta et al. | ............... | 369/30.08 |
| 7,478,132 B2 | 1/2009 | Chen et al. | | |
| 2002/0059343 A1 * | 5/2002 | Kurishima et al. | ........... | 707/512 |
| 2002/0154120 A1 * | 10/2002 | Cullimore et al. | ........... | 345/441 |
| 2003/0016386 A1 * | 1/2003 | Wiebe et al. | ................ | 358/1.15 |

(Continued)

FOREIGN PATENT DOCUMENTS

| | | |
|---|---|---|
| TW | 200945832 A | 11/2009 |
| TW | 201121267 A1 | 6/2011 |
| WO | 2011072890 A1 | 6/2011 |

OTHER PUBLICATIONS

Multiple Email Access; Jul. 5, 2009; DayCom Solutions; pp. 1-2.*

(Continued)

*Primary Examiner* — Andrew Dyer
(74) *Attorney, Agent, or Firm* — Cuenot, Forsythe & Kim, LLC (57) ABSTRACT

Annotating a document in a data processing system, wherein the document includes a first content section and a data structure, can include receiving a request to annotate the document, wherein the request comprises an annotation, and an identification of the document to annotate, and creating a second content section comprising the annotation. The data structure can be updated with a reference to the second content section thereby making the second content section available as an annotation in association with the document.

19 Claims, 6 Drawing Sheets

(56) References Cited

U.S. PATENT DOCUMENTS

| | | | |
|---|---|---|---|
| 2003/0163525 A1* | 8/2003 | Hendriks et al. | 709/204 |
| 2004/0003352 A1 | 1/2004 | Bargeron et al. | |
| 2004/0078757 A1* | 4/2004 | Golovchinsky et al. | 715/512 |
| 2004/0261016 A1* | 12/2004 | Glass et al. | 715/512 |
| 2005/0120019 A1* | 6/2005 | Rigoutsos et al. | 707/6 |
| 2005/0160145 A1 | 7/2005 | Gruen et al. | |
| 2005/0188016 A1* | 8/2005 | Vdaygiri et al. | 709/205 |
| 2006/0143560 A1* | 6/2006 | Gupta et al. | 715/512 |
| 2006/0168346 A1 | 7/2006 | Chen et al. | |
| 2007/0245238 A1 | 10/2007 | Fugitt et al. | |
| 2008/0104503 A1* | 5/2008 | Beall et al. | 715/233 |
| 2008/0165207 A1* | 7/2008 | Koshak et al. | 345/620 |
| 2009/0043852 A1 | 2/2009 | Weir et al. | |
| 2009/0125597 A1* | 5/2009 | Carr et al. | 709/206 |
| 2009/0157820 A1* | 6/2009 | Sampang et al. | 709/206 |
| 2009/0210778 A1 | 8/2009 | Kulas et al. | |
| 2010/0030798 A1* | 2/2010 | Kumar et al. | 707/102 |
| 2010/0278453 A1* | 11/2010 | King | 382/321 |
| 2010/0287236 A1* | 11/2010 | Amento et al. | 709/204 |

OTHER PUBLICATIONS

Resnick; Request for Comments: 5322 Internet Message Format; Oct. 2008, Internet Engineering Task Force; pp. 1-57.*

"Rule 1;" Commas; Aug. 31, 2004; The Blue Book of Grammar and Punctuation; p. 1.*

Trademark Law in the United States; Dec. 1, 2008; bitlaw.com; p. 1.*

"Document;" Class 715 Data Processing: Presentation of Document, Operator Interface Processing, and Screen Saver Display Processing; Nov. 14, 2009; pp. 1-34.*

"Data structure;" Free On-Line Dictionary of Computing; Sep. 11, 2003; foldoc.org; pp. 1-3.*

Avram, A., "Google Wave's Architecture," [online] InfoQ.com, C4Medica, Inc., Jun. 1, 2009 [retrieved Jun. 15, 2012] retrieved from the Internet: <http://www.infoq.com/news/2009/06/wave>, 5 pgs.

WIPO Appln. PCT/EP2010/061442, International Search Report, Nov. 5, 2010, 4 pg.

WIPO Appln. PCT/EP2010/061442, Written Opinion, Jun. 15, 2012, 5 pg.

* cited by examiner

ELECTRONIC DOCUMENT ANNOTATION

CROSS-REFERENCE TO RELATED APPLICATIONS

This application is the national stage of PCT/EP10/061442 filed Aug. 5, 2010, designating, inter alia, the United States and claiming priority to European Patent Application No. 09179211.9 filed Dec. 15, 2009, each of which is hereby incorporated by reference in its entirety.

BACKGROUND

Collaborative sharing of electronic documents is a common use of the Internet. An electronic mail message, also known as an email message, is an example of a collaborative document. Typically, an email system comprises a server-based email computer program operating on a server computer, that manages the exchange of email messages over one or more networks, and a client-based email computer program operating on a client computer to implement a mail box that receives and holds email messages for a user. Typically, client-based email computer programs also include a graphical user interface (GUI) to enable a user to open and read email messages in addition to creating new email messages. An email system may use a client-server model, where an email message is sent from a server to a client. A user of the client may view a copy of the email message on a local computer. Alternatively, an email system may use an internet model where the email message is stored on a server, and a user of the system may view the email message on the server through an internet connection with the local machine of the user.

An 'email client' is a client-based email computer program.

An email message typically comprises metadata, a message body, and header information (for example, a distribution list). The metadata structure comprises information about the email message, the body, and the header information. Typically, metadata is not displayed by an email client.

Typically, sent email messages, are routed to a Simple Mail Transfer Protocol (SMTP) delivery server or a mail router, and then forwarded to those listed on the email. Email messages within an email system have a consistent structure: for example, a distribution list, a subject, a body and attachments. Email messages may be as rich in content and as long as necessary.

Users often send email messages to multiple recipients. A recipient of an email message may reply to a sender of the email message. A reply message is itself an email message and is sent using email transmission protocols. A reply message does not alter the original email message, but is a separate email message. Reply messages may be associated with the original email message to create a history record of an email communication. A reply message may be made solely to the sender of an email message, or to the sender and all recipients ('reply-to-all') of an email message. Typically, the reply message may also include a copy of the original email message text body, or a copy of the original email message text body, which a replying user has annotated. However, a problem exists with replying to an email message sent to multiple recipients, as the sender of the email message must collate information from multiple replies, before the sender and the recipients can see a consistent view of the email message and the multiple replies. Even if a recipient copies the other recipients on a reply (for example by using a reply-to-all option), the entire process of collecting reply information generates many email messages between the sender and recipients, and becomes very time consuming for the original sender or those users on the distribution list to keep track of all of the responses. The process also consumes many computer resources.

BRIEF SUMMARY

An embodiment can include a method. The method can include receiving, within a data processing system, a request to annotate a document, wherein the request includes an annotation, and an identification of a document to annotate, and responsive to receiving the request, analysing the request to identify the annotation, and the document to which the annotation is related. The document can include a first content section and a data structure. Responsive to identifying the annotation, a second content section can be created that includes the annotation. Responsive to identifying the document using the identification, the data structure can be updated with a reference to the second content section thereby making the second content section available in association with the document.

Another embodiment can include a system. The system can include a data processing system configured to initiate executable operations. The executable operations can include receiving a request to annotate a document, wherein the request includes an annotation, and an identification of a document to annotate, and responsive to receiving the request, analysing the request to identify the annotation, and the document to which the annotation is related. The document can include a first content section and a data structure. Responsive to identifying the annotation, a second content section can be created that includes the annotation. Responsive to identifying the document using the identification, the data structure can be updated with a reference to the second content section thereby making the second content section available in association with the document.

Another embodiment can include a computer program product. The computer program product can include a computer readable storage medium having computer readable program code embodied therewith that, when executed, configures a processor to perform executable operations. The executable operations can include receiving a request to annotate a document, wherein the request includes an annotation, and an identification of a document to annotate, and responsive to receiving the request, analysing the request to identify the annotation, and the document to which the annotation is related. The document can include a first content section and a data structure. Responsive to identifying the annotation, a second content section can be created that includes the annotation. Responsive to identifying the document using the identification, the data structure can be updated with a reference to the second content section thereby making the second content section available in association with the document.

BRIEF DESCRIPTION OF THE SEVERAL VIEWS OF THE DRAWINGS

One or more aspects of the present invention will now be described, by way of example only, with reference to preferred embodiments, as illustrated in the following figures.

DETAILED DESCRIPTION

Viewed from a first aspect the present invention provides an apparatus for annotating a document in a data processing system, wherein the document comprises a first content section and a data structure, the apparatus comprising: a receiver component for receiving a request to annotate the document, wherein the request comprises an annotation, and an identification of the document to annotate; an analyser component, responsive to the receiver component receiving the request, for analysing the request to identify the annotation, and the document to which the annotation is related; a creator component, responsive to the analyser component identifying the annotation, for creating a second content section comprising the annotation; and an updater component, responsive to the analyser component identifying the document using the identification, for updating the data structure with a reference to the second content section thereby making the second content section available in association with the document.

Preferably, an aspect of the present invention provides an apparatus, wherein the apparatus further comprises a display component for displaying the document and the second content section.

Preferably, an aspect of the present invention provides an apparatus, wherein the document is an email document. Alternatively, the present invention provides an apparatus, wherein the document is an instant message.

Preferably, an aspect of the present invention provides an apparatus, wherein the apparatus further comprises a sender component for sending the document. Preferably, the present invention provides an apparatus, wherein the sender component is further operable for sending the request. Preferably, the present invention provides an apparatus, wherein the receiver component is further operable for receiving the document.

Preferably, an aspect of the present invention provides an apparatus, wherein the request is an asynchronous request.

Viewed from a second aspect the present invention provides a method for annotating a document in a data processing system, wherein the document comprises a first content section and a data structure, the method comprising the steps of: receiving a request, wherein the request comprises a message, and an identification of the document; responsive to receiving the request, analysing the request to identify the message, and the identification; responsive to identifying the message, creating a second content section, wherein the second content section comprises the message; and responsive to identifying the identification, updating the data structure with a reference to the second content section thereby making the second content section available.

Preferably, an aspect of the present invention provides a method, wherein the method further comprises the step of displaying the document and the second content section.

Preferably, an aspect of the present invention provides a method, wherein the document is an email document.

Preferably, an aspect of the present invention provides a method, wherein the document is an instant message.

Preferably, an aspect of the present invention provides a method, wherein the method further comprises the step of sending the document.

Preferably, an aspect of the present invention provides a method, wherein the method further comprises the step of sending the request.

Preferably, an aspect of the present invention provides a method, wherein the method further comprises the step of receiving the document.

Preferably, an aspect of the present invention provides a method, wherein the request is an asynchronous request.

Viewed from a third aspect, the present invention provides a computer program comprising computer code to, when loaded into a computer system and executed thereon, cause said computer system to perform all of the steps of the invention.

Advantageously, an aspect of the present invention provides an apparatus, method and computer program to annotate an original electronic document as well as all different repliers' copies of the document without resending the message, thereby reducing mail threads and mail traffic. This reduces the amount of electronic messages or invitations in a user's In-box. Unlike email annotation that is associated with the annotator's copy of an original electronic message, a notelet will be added to the original electronic message along with all different repliers' notelets without resending the original electronic message. A notelet is added to an electronic document in a manner that simplifies the management of such electronic documents for sender, so that all the related information can be viewed in one single document. A second content section may be provided as an annotation of the original electronic document, without altering the original content. The annotation is provided a notelet of a set format that inherits characteristics from the annotated email message.

Advantageously, an aspect of the invention may also be applied to meeting invitations, where a notelet concerning the original invitation, for example about people attending can be associated with the original invitation. One or more aspects of the present invention provide overall better efficiency and management of electronic messages containing a long list of recipients, as well as a great reduction of mail exchange through a network and reduction of space requirement on email servers.

As an example, users may use notelets when responding to an email calendar invitation: rather than sending separate responses to the originator, an invitee could annotate the original calendar invitation with a notelet signifying whether the invitee can attend or not.

Advantageously, prior art systems and methods of email propagation relying on routers is bypassed. Users benefit from the annotation directly from the server once created.

Figure 1:
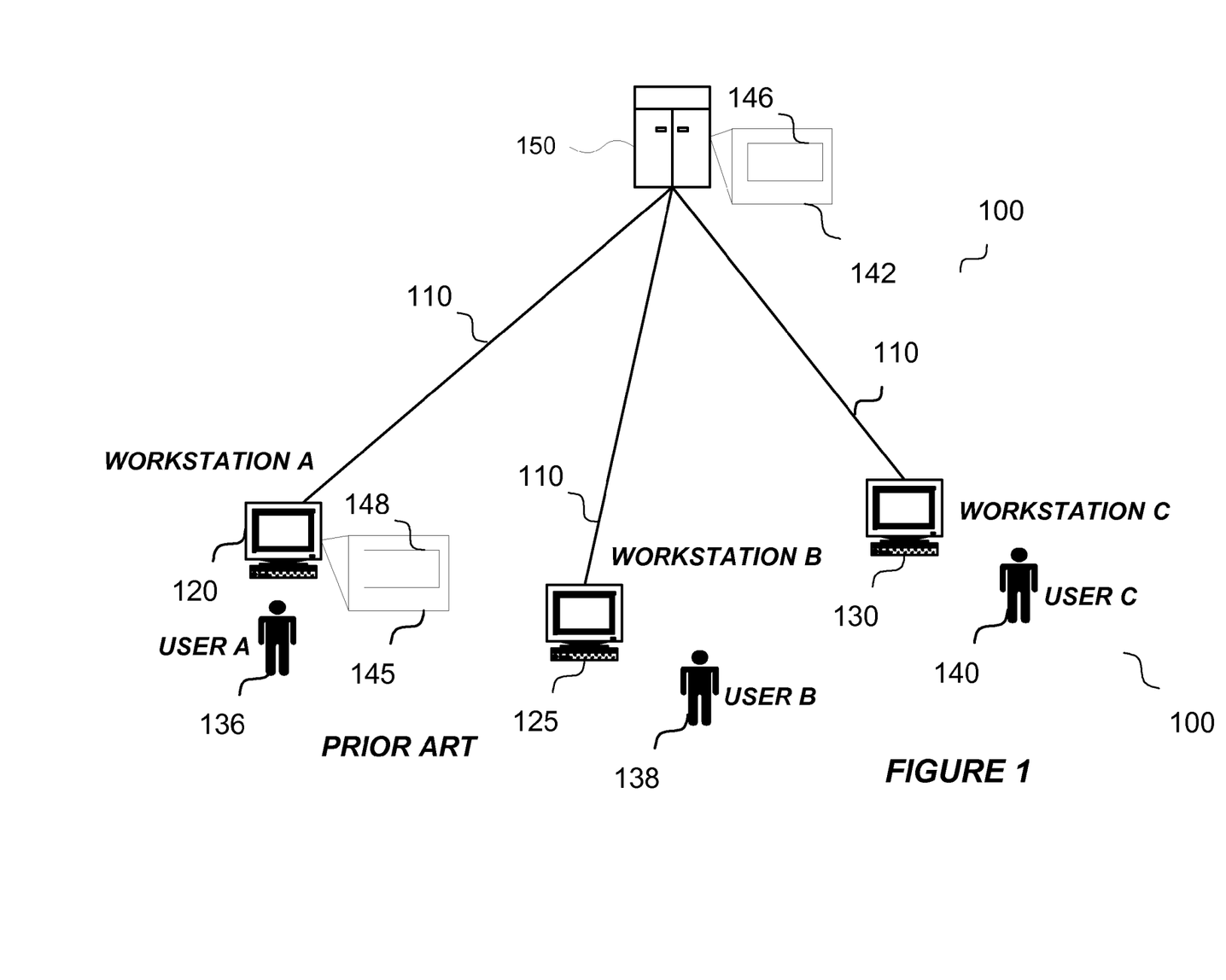
FIG. 1 is a block diagram depicting a data processing system, in accordance with a preferred embodiment of the present invention.

FIG. 1 is a block diagram depicting a data processing system 100, in accordance with a preferred embodiment of the present invention. An email system (not depicted) is used on a data processing system 100 that comprises workstation A 120, workstation B 125, workstation C 130, and a server 150. Workstations 120, 125, 130 and server 150 are connectable through a data processing network 110. An email client 145 is operable on the workstations 120, 125, 130 in communication with an email server 142 operated on the server 150, and with each other. Only the email client 145 on workstation A 120 is depicted. FIG. 1 depicts User A 136, User B 138, and User C 140. Users access the email system by interacting with an email client operating on a workstation 120, 125, 130. For example, User A 136 accesses the email system by interacting with the email client 145 operating on workstation A 120. Email message interactions between User A 136, User B 138, and User C 140 are performed by email clients 145 that User A 136, User B 138, and User C 140 respectively interact with. In a client-server email system, an email client 145 sends a copy of an email message 148 to another email client 145 through an email server 142. In an Internet email system, an email client 145 accesses an email message 146, composed by User A 136 and stored on an email server 142 through an Internet connection 110.

By way of description, as an example, User A 136 is a sender of an original email message 148 to User B 138 and User C 140. Following receipt of the original email message 148, User B 138 replies to User A 136 with an asynchronous request comprising a comment message concerning the original email message. The email client 145 of User B 138 sends the request to the sender's email server 142 to attach the comment message to the original email message in the form referred to herein as a "notelet". A notelet is an annotation to an email message. A notelet has pre-imposed limitations (for example, display format, and maximum size). Some information concerning the notelet is inherited or derived from the associated email message. Although associated with an email message, a notelet does not follow typical email system ways of sending or receiving or routing.

Figure 2:
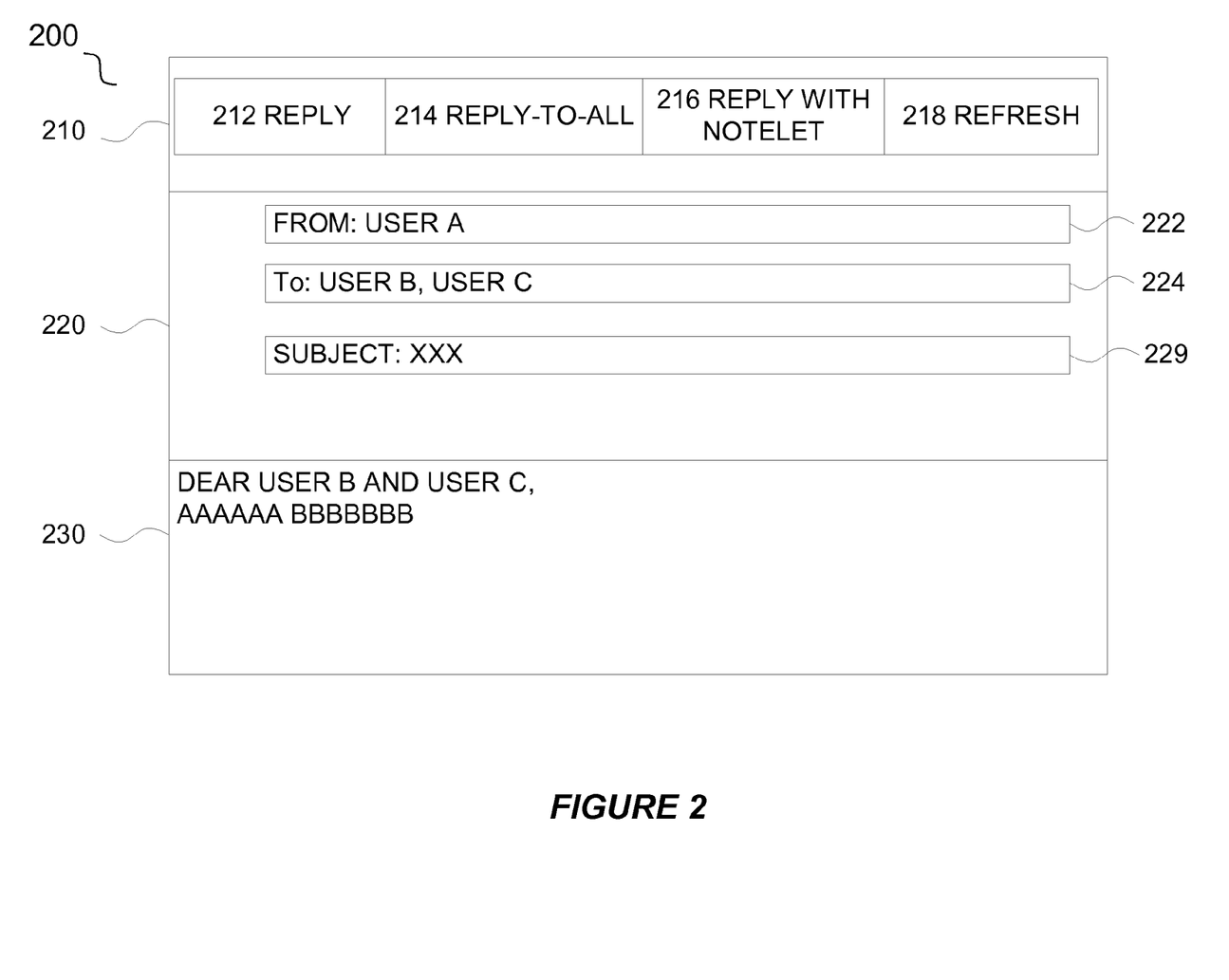
FIG. 2 is a diagram depicting an exemplary view from a simplified email client, in accordance with a preferred embodiment of the present invention.

FIG. 2 is a diagram depicting an exemplary view 200 from a simplified email client 145, in accordance with a preferred embodiment of the present invention. The view 200 depicts an email message 148 as viewed by the sender User A 136, including a header information section 220 and a content section 230. The content section 230 comprises text. The header information section 220 indicates that this email message 148 was previously sent by User A 136 ('From' section 222) to two recipients (User B 138 and User C 138 in 'To' section 224). The header information section 220 also comprises a subject section 229, which indicates the subject of the email message 148. The graphical user interface (GUI) of the email client 145 provides a section 210 for displaying functions 212, 214, 216, 218. The functions comprise: a reply button 212 for replying to the sender; a reply-to-all button 214 for replying to all; a reply-with-notelet button 216 for replying with a notelet to a sender. In an alternative embodiment, the functions also include a refresh button 218 for updating the email message 148 to include any notelet received, although the refresh process could be automatic. The content section 230 comprises the text of the email message 148.

Figure 3:
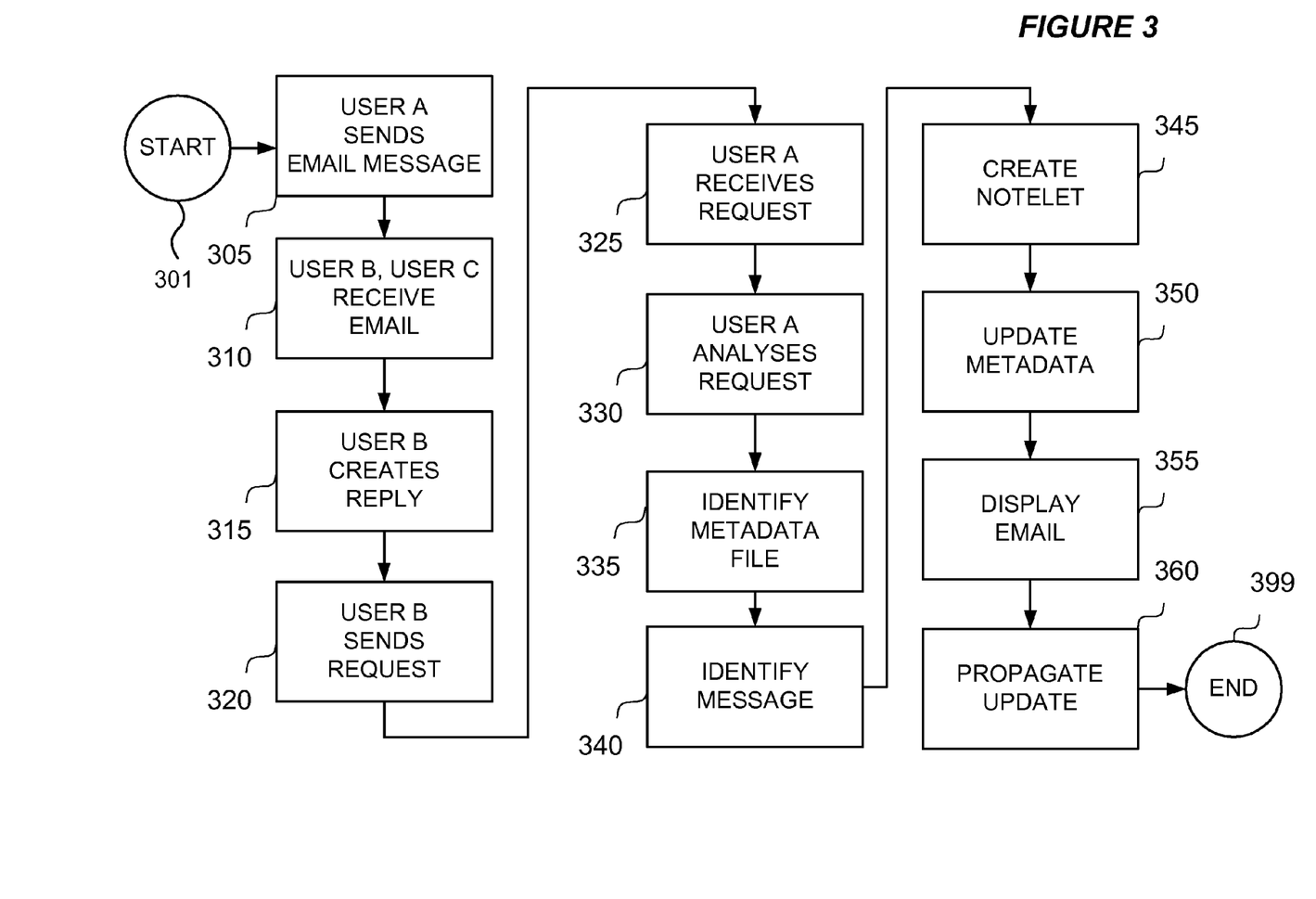
FIG. 3 is a high-level exemplary schematic flow diagram depicting typical operation method steps performed by an email agent, in accordance with a preferred embodiment of the present invention.
Figure 4:
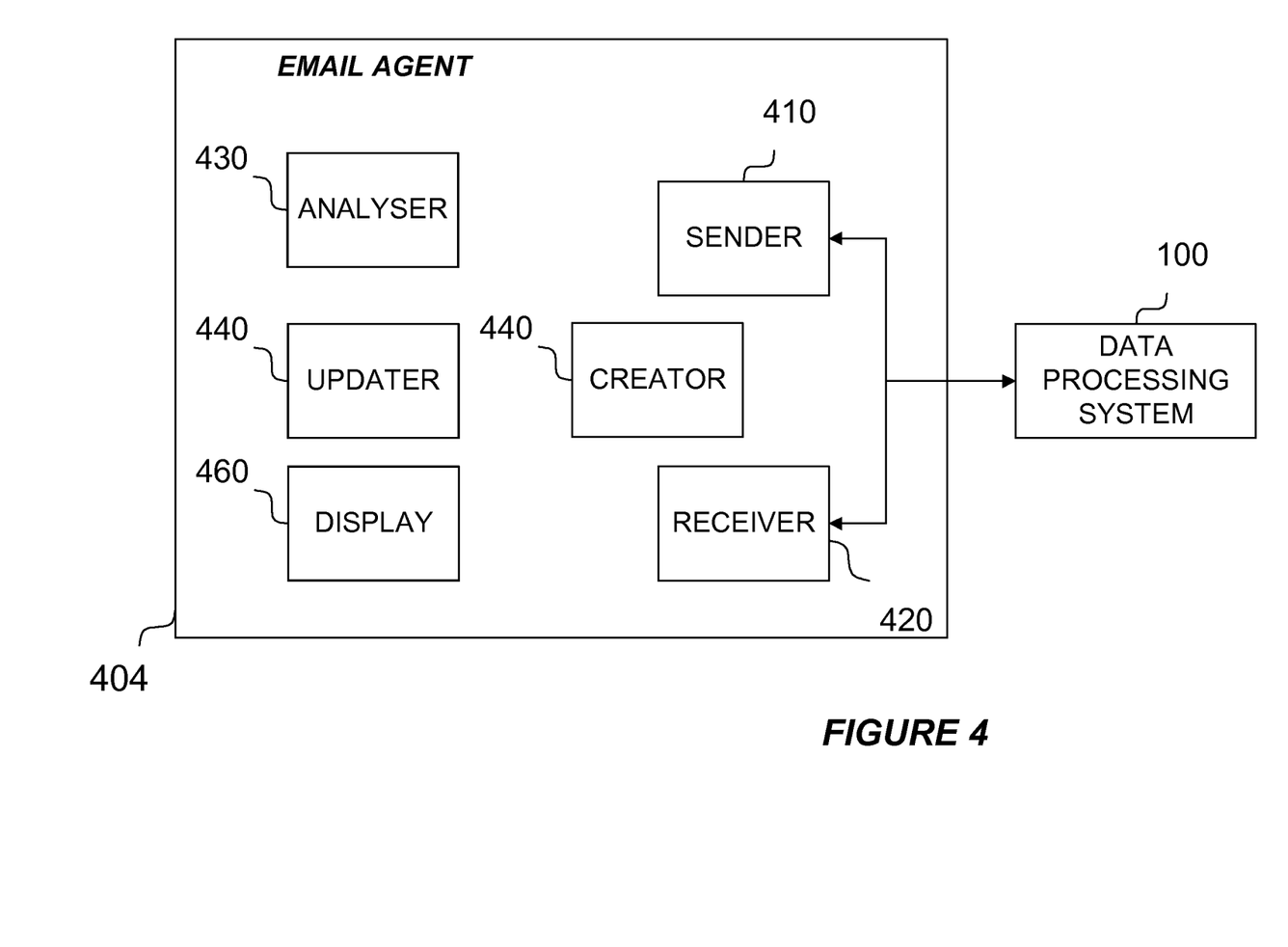
FIG. 4 is an exemplary block diagram depicting the email agent in which one or more aspects of the present invention may be embodied.
Figure 5:
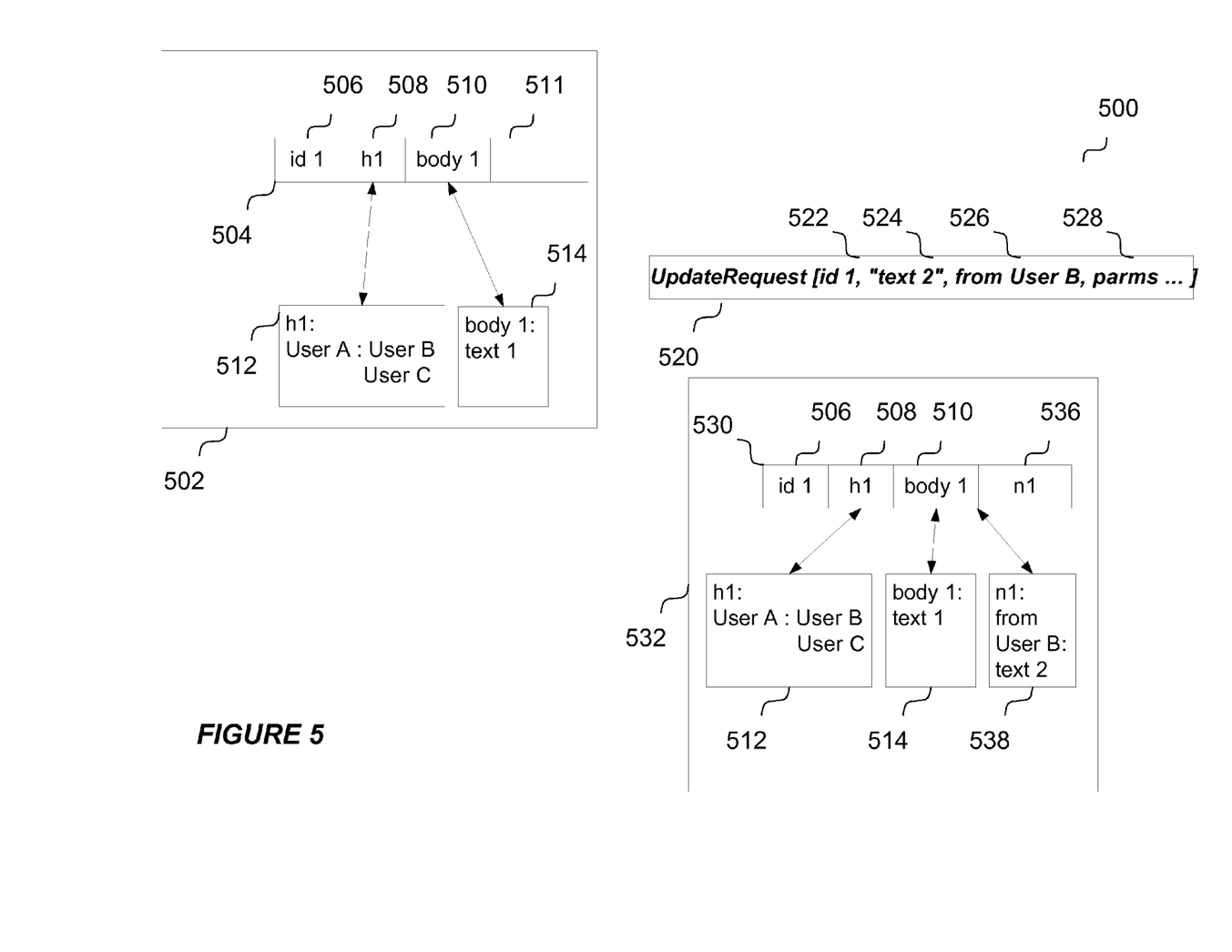
FIG. 5 is a block diagram depicting messages operating in an email system, in accordance with a preferred embodiment of the present invention.
Figure 6:
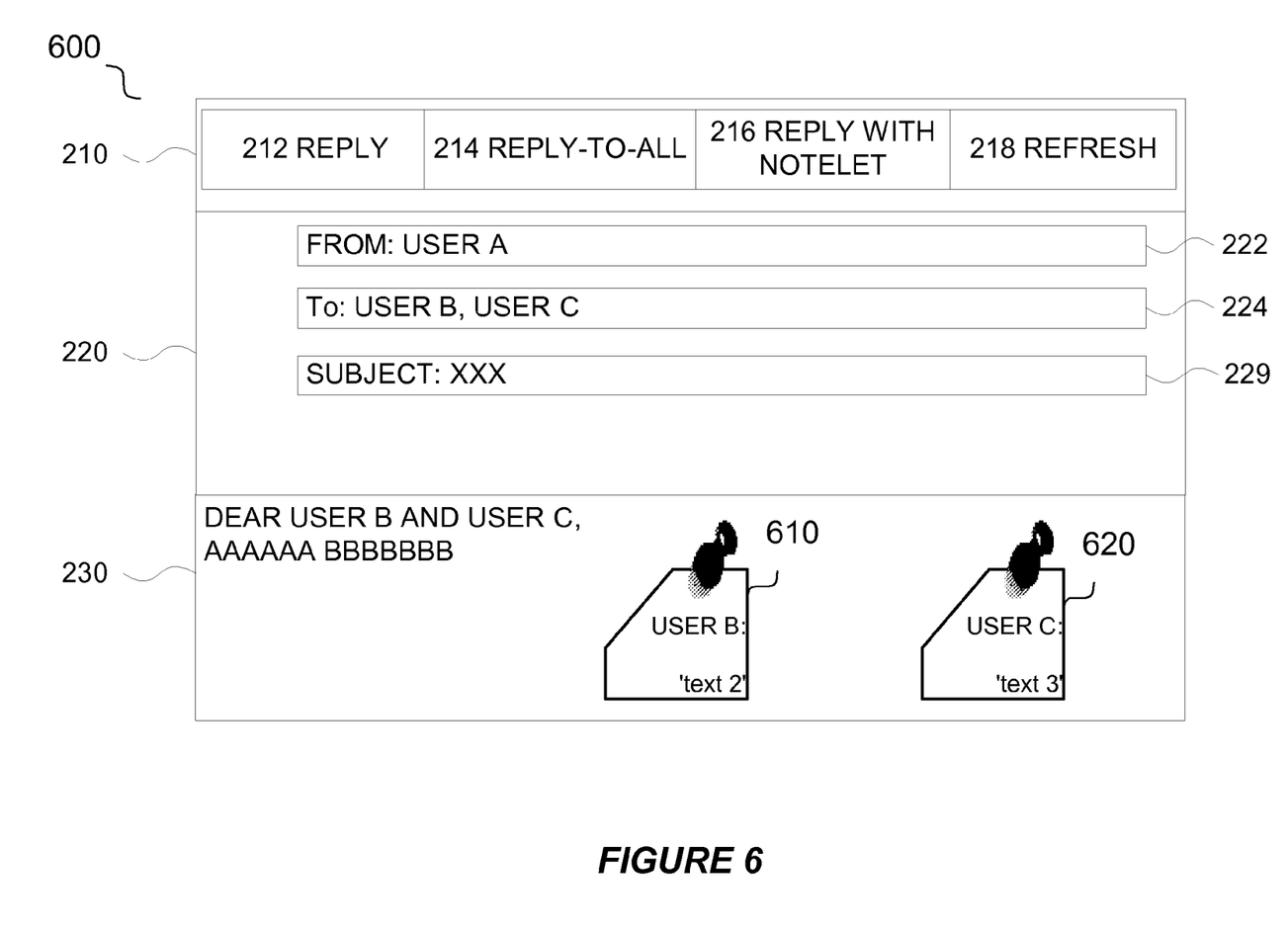
FIG. 6 is a diagram depicting the exemplary view from a simplified email client, in accordance with a preferred embodiment of the present invention.

FIG. 3, which should be read in conjunction with FIGS. 4, 5, and 6 is a high-level exemplary schematic flow diagram 300 depicting operation method steps performed by an email agent 404 of sender User A 136 to annotate the email message 148 with replies from User B 138 and User C 140 in accordance with a preferred embodiment of the present invention. The flow diagram depicts the steps performed in a client-server email system. FIG. 3 is set forth as a logical flow chart diagram. As such, the depicted order and labelled steps are indicative of one embodiment of the presented method. Other steps and methods may be conceived that are equivalent in function, logic, or effect of one or more steps or portions thereof, of the illustrated method. Additionally the format and symbols employed are provided to explain the logical steps of the method and are understood not to limit the scope of the method.

FIG. 4, is an exemplary block diagram depicting the email agent 404 in which one or more aspects of the present invention may be embodied. FIG. 5 is a block diagram 500 depicting messages operating in an email system, in accordance with a preferred embodiment of the present invention. FIG. 6 is a diagram depicting the exemplary view 600 from a simplified email client 145, in accordance with a preferred embodiment of the present invention.

The method starts at step 301. At step 305, a sender component 410 of User A 136 sends an email message 148, 502 to User B 138, and to User C 140. The email message 502 comprises a metadata structure 504, a header 512 and a content 514. The metadata structure 504 is a rich text object associated with the email message 146, 148, directly linked to the extension point of the Internet Mail Request for Comments (RFC). The Internet Mail RFC document acts as an Internet Engineering Task Force (IETF) standard for defining Internet mail protocols. The metadata structure 504 comprises sections that provide links between the elements of the email message 148. An identification section 506 comprises an identification 'id 1' of the email message 502. A header section 508 identifies the header 'h1' 512. A content section 510 identifies the content 'body 1' 514. The content 'body 1' 514 comprises text 'text 1'. In an alternative embodiment metadata structure 504 may also comprise additional sections 511.

At step 310, a receiver component 420 of User B 136 and of User C 138 receives the email message 'id 1' 148, 502. At step 315, User B 138 creates a reply to User A 136 using a notelet application programming interface (API) by triggering the reply-with-notelet button 216. At step 320, the sender component 410 of User B 138 sends and saves a request 520 to update a metadata structure 504 associated with the email message 'id 1' 148, 502. The request 520 comprises an identification parameter 522 of the email message 148, 502 that it is associated with; a message parameter 524, for example "text 2"; and a sender parameter 526 to signify the sender User B 138 of the notelet The request 520 is sent to the email agent 404 of User A 136. The request 520 is sent as an 'Asynchronous JavaScript and Extensible Markup Language' (Ajax) request. Ajax requests from a client can retrieve data asynchronously in the background from a server, without affecting an existing webpage. In an alternative embodiment the request 520 may also comprise additional parameters 528.

At step 325, the receiver component 420 of the email agent 404 of User A 136 receives the request 520. An analyser component 430 of User A 136 analyses the request 520. At step 335, the analyser component 430 identifies the identification of the originating email message 148, 502 from the identification parameter 522 and locates the associated metadata structure 504 associated with the email message 'id 1' 148. At step 340, the analyser component 430 identifies a message 'text 2' of the request 520 from the message parameter 524.

At step 345, a creator component 440 of User A 136 creates a notelet 'n1' 538, comprising the message 'text 2'. At step 350, an updater component 440 of User A 136 updates the metadata structure 504 of the identified email message 502. The updated metadata structure 530 comprises the identification section 506, the header section 508, the content section 510, and a notelet section 536. The notelet section 536 identifies the associated notelet 'n1' 538. Preferably, the metadata structure may be updated exploiting extension points that exist in the current Mail RFC. Exploiting RFC extension points allows an email system of a preferred embodiment of the invention to coexist with prior art email clients.

At step 355, a display component 460 of User A 136 displays the original email message 148 and any notelets 538 identified by the updated metadata structure 530. FIG. 6 depicts the exemplary view 200, 600 of the email client 145 of email message 'id 1' 148, notelet 538, 610 from User B 138 with text 'text 2', and a notelet 538, 620 from User C 138 with text 'text 3'. The body 514 of the original email message 148 has not been updated, but rather has been displayed with any attached notelets 538. In a preferred embodiment, a notelet 538 is an annotation that is visualised proximate to the body 514 of the original email message 148. The annotation is one level deep, in contrast to the body 514 of the original email message 148 that may have multiple degrees of nesting and hence capability. Being one level deep and being annotations means that notelets 538 are different from annotations in prior art solutions.

Alternatively, the notelet may be made available in any form, for example as a HyperText Markup Language (HTML) page, or any client rendered page. Alternatively, the notelet may be made available as a Uniform Resource Locator (URL), which is linked to the notelet content.

At step 360, the sender component 410 of User A 136, propagates the notelet 538 to the recipients User B 138 and User C 140. The email agents 404 at User B 138, and User C 140 follow steps 335, 350, and 355 to update the respective metadata structures 504 of the copies of the email message 'id 1' 148, and to display the original copy of the email message 148 and any notelets 538 identified by the updated metadata structure 530. In this way, all recipients of the email message 'id 1' 148 display a consistent view of the email message 148 and any associated notelets. The notelet 538 is cached by User B 138 and User C 140. If there are subsequent updates to the notelet 538, the server sends updated content only, rather than the entire notelet 538. The method ends at step 399.

In an alternative embodiment, at step 360, the sender component 410 of User A 136, forwards the request 520 to the recipients User B 138 and User C 140. The email agents 404 at User B 138, and User C 140 follow steps 325, 330, 335, 340, 350, and 355 to update the respective metadata structures 504 of the copies of the email message 'id 1' 148, and to display the original copy of the email message 148 and any notelets 538 identified by the updated metadata structure 530.

In an alternative embodiment, a refresh button 218 is provided in the email client 145 for manual refresh of the display to view newly received notelets 404.

In an alternative embodiment, the email agent 404 at User B 138 uses the saved request from step 320, and follows steps 325, 330, 335, 340, 350, and 355 to update the metadata structure 504 of the copies of the email message 'id 1' 148, and to display the original copy of the email message 148 and a notelet 538 identified by the updated metadata structure 530.

In an alternative embodiment of a client-server email system, the email agent 404 of User A 136, User B 138, and User C 140 is operable on the email server 142.

In the preferred embodiment in an Internet email system, the email agent 404 is also operable on the email server 142 to update a metadata structure 504 associated with an email message 146 on a server 150. In this embodiment there is no requirement to propagate a request 520 at step 360 to the recipients, because User A 136, User B 138, and User C 140 all have visibility of the same email message 146 on the email server 142.

In a preferred embodiment, the request 520 comprises Multipurpose Internet Mail Extensions (MIME) encoded header information providing details of a notelet 538. The MIME encoded header information is designated as an update type and contain information on the identification 522 of the email message 146, 502 that was sent. The header information may contain information about, for example, the subject, date and time to enable full identification of the email message 146, 148 by the receiving email agent 404. The email agent 404 may recognise the update encoding in the email and be able to process the header information included to identify the original email.

In a preferred embodiment, an icon is displayable in an email message list associated with an email message 146, 148 that has had a notelet 404 applied. The icon indicates to a user that there is new notelet 404, which has been attached to the original email message 146, 148. The color for the icon is changed according to different states of the notelet 146, 148. An example of a notelet state is 'viewed by email message sender'.

In a preferred embodiment, a notelet 404 comprises related auditing information. For example, the date, and the sender (User B 138) of the notelet 538.

In a preferred embodiment, the availability of a notelet 404 to recipients of an email message 146, 148 is set by the sender 136 of the email message 146, 148. For example, User A 136 blocks the visibility of notelets 404 to certain recipients. This may be controlled through the 'To' distribution list depicted in the 'To' section 224, or through the 'cc' distribution list (not depicted).

In the preferred embodiment, at the point of creation of the notelet 404, an AJAX transaction request 520 is sent to the email server 142, which in turn immediately propagates the information in the request 520 to all other recipients of the email message 146, 148. Alternatively, propagation of information may be made by aggregating a number of requests. A user is not dependent on prior art email replication, or other prior art semantics concerning mail routing and mail delivery. An AJAX transaction is an action between email client 145 and email server 142 that takes place immediately.

In an alternative embodiment, propagation of the request 520 is carried out using prior art replication techniques between email client 145 and email server 142.

A notelet 538 inherits "subject matter" and "distribution list" header information from the associated email message 148, 502. The notelet 538 inherits "from" header information from the user User B 138 that sent the request 520. Therefore, the distribution list of the notelet 538 is always inherited or derived.

The characteristics of the notelet 538 (for example, the maximum size) is defined by an email system implementation. In contrast, the body 514 of an original email message 148 or of a prior art reply email message 148 is defined by the creating author. The notelet 538 is automatically propagated to all users 138, 140, because the notelet 538 inherits the distribution list of the associated email message 148, 502.

In an alternative embodiment the data processing system comprises an instant message (IM) system. The IM system allows for collaborative IM exchanges between two participants, or for more than two participants multiple participants. Annotations of IM group chats by the multiple participants are made using notelets. The document that is annotated is an instant message.

In an alternative embodiment the document that is annotated is a collaborative document that is stored on a shared directory. An example of a collaborative document is an IBM® LOTUS® SYMPHONY document (IBM, LOTUS and SYMPHONY are trademarks of International Business Machines Corporation in the United States, other countries, or both.)

For the avoidance of doubt, the term "comprising", as used herein throughout the description and claims is not to be construed as meaning "consisting only of". It will be appreciated by those skilled in the art that the invention is not just limited to email messages, but is also applicable to other types of collaborative documents, for example, in group chats in an instant messaging system.

What is claimed is:

1. A method, comprising:
   receiving, within a data processing system, a request to annotate a document, wherein the request comprises an annotation, and an identification of a document to annotate;
   responsive to receiving the request, analysing the request to identify the annotation, and the document to which the annotation is related, wherein the document comprises a first content section and a data structure;
   responsive to identifying the annotation, creating a second content section comprising the annotation; and
   responsive to identifying the document using the identification, updating the data structure with a reference to the second content section thereby making the second content section available in association with the document.

2. A method performed by a computer hardware system, comprising:
   sending, to first and second client computer systems, an electronic document having a first content section and a data structure;
   receiving, after the sending and from the first client computer system, a request including an annotation and an identification of the electronic document;
   creating, within the electronic document and based upon the identification and the annotation, a second content section;
   updating the data structure of the electronic document to include a reference to the second content section; and
   propagating the second content section and the updated data structure to the second client computer system without including the first content section.

3. The method of claim 2, wherein
   the request does not include the first content section.

4. The method of claim 2, wherein
   the request is an Ajax request.

5. The method of claim 2, wherein
   the data structure includes a notelet section, and
   the notelet section identifies the second content section.

6. The method of claim 2, wherein
   the creating the second content section does not modify the first content section.

7. The method of claim 2, wherein
   the second content section is at least one level deeper than the first content section.

8. The method of claim 2, wherein
   the computer hardware system is a third client computer system.

9. The method of claim 2, wherein
   the computer hardware system is an email server, and
   the electronic document is initially received from a third client computer system.

10. The method of claim 2, wherein
    the electronic document was sent to a fourth client computer system, and
    the propagating does not forward the second content section and the updated data structure to the fourth client computer system.

11. A computer hardware system, comprising:
    at least one hardware processor configured to initiate the following operations:
      sending, to first and second client computer systems, an electronic document having a first content section and a data structure;
      receiving, after the sending and from the first client computer system, a request including an annotation and an identification of the electronic document;
      creating, within the electronic document and based upon the identification and the annotation, a second content section;
      updating the data structure of the electronic document to include a reference to the second content section; and
      propagating the second content section and the updated data structure to the second client computer system without including the first content section.

12. The system of claim 11, wherein
    the request does not include the first content section.

13. The system of claim 11, wherein
    the request is an Ajax request.

14. The system of claim 11, wherein
    the data structure includes a notelet section, and
    the notelet section identifies the second content section.

15. The system of claim 11, wherein
    the creating the second content section does not modify the first content section.

16. The system of claim 11, wherein
    the second content section is at least one level deeper than the first content section.

17. The system of claim 11, wherein
    the computer hardware system is a third client computer system.

18. The system of claim 11, wherein
    the computer hardware system is an email server, and
    the electronic document is initially received from a third client computer system.

19. The system of claim 11, wherein
    the electronic document was sent to a fourth client computer system, and
    the propagating does not forward the second content section and the updated data structure to the fourth client computer system.

* * * * *